(12) United States Patent
Lee et al.

(10) Patent No.: US 11,400,765 B2
(45) Date of Patent: Aug. 2, 2022

(54) TIRES WITH IMPROVED RIM FITABILITY

(71) Applicant: HANKOOK TIRE & TECHNOLOGY CO., LTD, Seoul (KR)

(72) Inventors: Young Do Lee, Daejeon (KR); Kwang Tae Kim, Gyeryong-si (KR); In Jeong Park, Daejeon (KR); Woo Haeng Heo, Daejeon (KR); Si Wan Kim, Daejeon (KR)

(73) Assignee: HANKOOK TIRE & TECHNOLOGY CO., LTD, Seoul (KR)

( * ) Notice: Subject to any disclaimer, the term of this patent is extended or adjusted under 35 U.S.C. 154(b) by 279 days.

(21) Appl. No.: 16/669,079

(22) Filed: Oct. 30, 2019

(65) Prior Publication Data

US 2020/0130424 A1 Apr. 30, 2020

(30) Foreign Application Priority Data

Oct. 31, 2018 (KR) .......................... 10-2018-0131386

(51) Int. Cl.
*B60C 15/024* (2006.01)

(52) U.S. Cl.
CPC .................................. *B60C 15/024* (2013.01)

(58) Field of Classification Search
CPC .......... B60C 15/024; B60C 2015/0614; B60C 15/0242; B60C 15/0247; B60C 2015/0245
See application file for complete search history.

(56) References Cited

U.S. PATENT DOCUMENTS

| 2,587,470 | A | * | 2/1952 | Herzegh | B60C 5/16 |
| | | | | | 152/504 |
| 5,660,655 | A | * | 8/1997 | Tagashira | B60C 15/024 |
| | | | | | 152/543 |
| 2004/0187995 | A1 | * | 9/2004 | Yoshinaka | B60C 3/04 |
| | | | | | 152/454 |

FOREIGN PATENT DOCUMENTS

| JP | 62299411 | A | * | 12/1987 | .......... B60C 15/024 |
| JP | 062378 | U | * | 1/1994 | |
| JP | 10071814 | A | * | 3/1998 | |
| JP | 2013039844 | A | * | 2/2013 | |
| JP | 2013078966 | A | * | 5/2013 | |
| JP | 6147626 | B2 | | 6/2017 | |
| KR | 2001018252 | A | * | 3/2001 | |

(Continued)

OTHER PUBLICATIONS

Machine Translation: JP-2013039844-A, Motoi, Osamu, (Year: 2021).*

(Continued)

*Primary Examiner* — Kendra Ly

(74) *Attorney, Agent, or Firm* — Novick, Kim & Lee, PLLC; Jae Youn Kim; Jihun Kim

(57) ABSTRACT

Provided is a tire with improved rim fitability that increases contact pressure of a heel by discharging air caught in a rim seat, makes rim fitability uniform by reducing a pressure difference, and increases a barcode recognition rate. The tire with improve rim fitability includes a rim seat having a rim check line, and a plurality of protrusions spaced apart from each other along a circumference of the rim seat and each including an upper protrusion unit and a lower protrusion unit, in which the upper protrusion unit and the lower protrusion unit are spaced apart from each other along the circumferential direction of the rim seat.

6 Claims, 11 Drawing Sheets

(56) References Cited

FOREIGN PATENT DOCUMENTS

KR            2016056373  A  *  5/2016
WO           WO-0125030  A1 *  4/2001   ........... B60C 15/024

OTHER PUBLICATIONS

Machine Translation: JP-10071814-A, Teramoto, Hideki, (Year: 2021).*
Machine Translation: JP-62299411-A, Hara, Hiroki, (Year: 2021).*
Machine Translation: JP-062378-U, N/A (Year: 2021).*
Machine Translation: KR2001018252A, Park B G, (Year: 2021).*
Machine Translation: KR2016056373A, Yeong G S, (Year: 2021).*
Machine Translation: JP-2013078966-A, Harada M, (Year: 2022).*

* cited by examiner

TIRES WITH IMPROVED RIM FITABILITY

BACKGROUND OF THE INVENTION

Field of the Invention

The present invention relates to a tire with improved rim fitability and, more particularly, a tire with improved rim fitability that can increase contact pressure of a heel by discharging air caught in a rim seat, can make rim fitability uniform by reducing a pressure difference, and can increase a barcode recognition rate.

Description of the Related Art

FIG. 1 shows a tire according to the related art.

As shown in FIG. 1, in general, the tire 1 of the related art has protrusions 3 perpendicularly protruding from the surface of a rim mount 2 to discharge air caught in the rim mount 2.

In detail, the protrusions, as shown in the figure, transversely extend from the outer side to the inner side of the rim mount 2 with the mid portions disconnected. That is, the protrusions are each composed of an upper protrusion 3 positioned outside and a lower protrusion 4 positioned inside with respect to the disconnected portion.

However, according to the protrusions of the related art formed as described above, the upper protrusion 3 and the lower protrusion 4 are positioned in a straight line, so the efficiency of discharging air caught in the rim seat and the contact pressure of the heel are low and pressure difference greatly changes depending on positions. Accordingly, there is a problem in that rim fitability is not uniform.

Further, the protrusions of the related art, as indicated by A in FIG. 1, when a barcode marked with a serial number is attached to the tire 1 and the position of the barcode overlaps the protrusion, has a problem in that the barcode cannot be read out.

In detail, when even any one of the lines constituting a barcode is covered by over 50%, the recognition rate remarkably decreases.

However, according to the protrusions of the related art, since the upper protrusion 3 and the lower protrusion 4 are positioned in the same line, when a barcode is marked on the rim mount 2 at a position overlapping the protrusion, there is a problem in that the upper protrusion 3 and the lower protrusion 4 unavoidably cover barcode lines by over 50%.

Accordingly, there is a need for a tire having uniform rim fitability and enabling a barcode to be read out regardless of the position of the barcode marked on a rim mount.

CITATION LIST

Patent Literature

Patent Literature 1: Japanese Patent No. 6147626

SUMMARY OF THE INVENTION

In order to solve the problems, an object of the present invention is to provide a tire with improved rim fitability and, more particularly, a tire with improved rim fitability that can increase contact pressure of a heel by discharging air caught in a rim seat, can make rim fitability uniform by reducing a pressure difference, and can increase a barcode recognition rate.

The objects to implement in the present invention are not limited to the technical problems described above and other objects that are not stated herein will be clearly understood by those skilled in the art from the following specifications.

In order to achieve the objects, the present invention provides a tire with improve rim fitability that includes: a rim seat having a rim check line; and a plurality of protrusions spaced apart from each other along the circumference of the rim seat and each including an upper protrusion unit and a lower protrusion unit, in which the upper protrusion unit and the lower protrusion unit are spaced apart from each other along the circumference of the rim seat.

In an embodiment of the present invention, the rim seat has a heel point extending along the inner circumference thereof.

In an embodiment of the present invention, the upper protrusion unit extends from the outer side of the rim seat to the rim check line and perpendicularly protrudes from the rim seat.

In an embodiment of the present invention, the lower protrusion unit is formed such that the lower end thereof is spaced by a predetermined gap apart from the heel point and the upper end thereof extends to the rim check line.

In an embodiment of the present invention, the distance between the lower end of the lower protrusion unit and the heel point is 3.9 mm to 4.1 mm.

In an embodiment of the present invention, the upper protrusion unit is spaced by a predetermined curvature, which is defined in the circumferential direction of the rim seat, apart from the position of the lower end of the lower protrusion unit.

In an embodiment of the present invention, the lower ends of the upper protrusion unit and the lower protrusion unit are formed at positions spaced by about 4.4 to 4.6 degrees apart from each other in the circumferential direction of the rim seat.

In an embodiment of the present invention, the lower end portion of the lower protrusion unit is tapered toward the heel point.

In an embodiment of the present invention, the rim check line is formed at a position such that the degree of interference with a barcode attached to the rim seat by the upper protrusion unit and the lower protrusion unit is 0 to less than 50%.

In an embodiment of the present invention, the tire further includes a round portion extending along the circumference of the rim seat while passing by the lower end of the upper protrusion unit and the upper end of the lower protrusion unit.

DETAILED DESCRIPTION OF THE PREFERRED EMBODIMENTS

Figure 1:
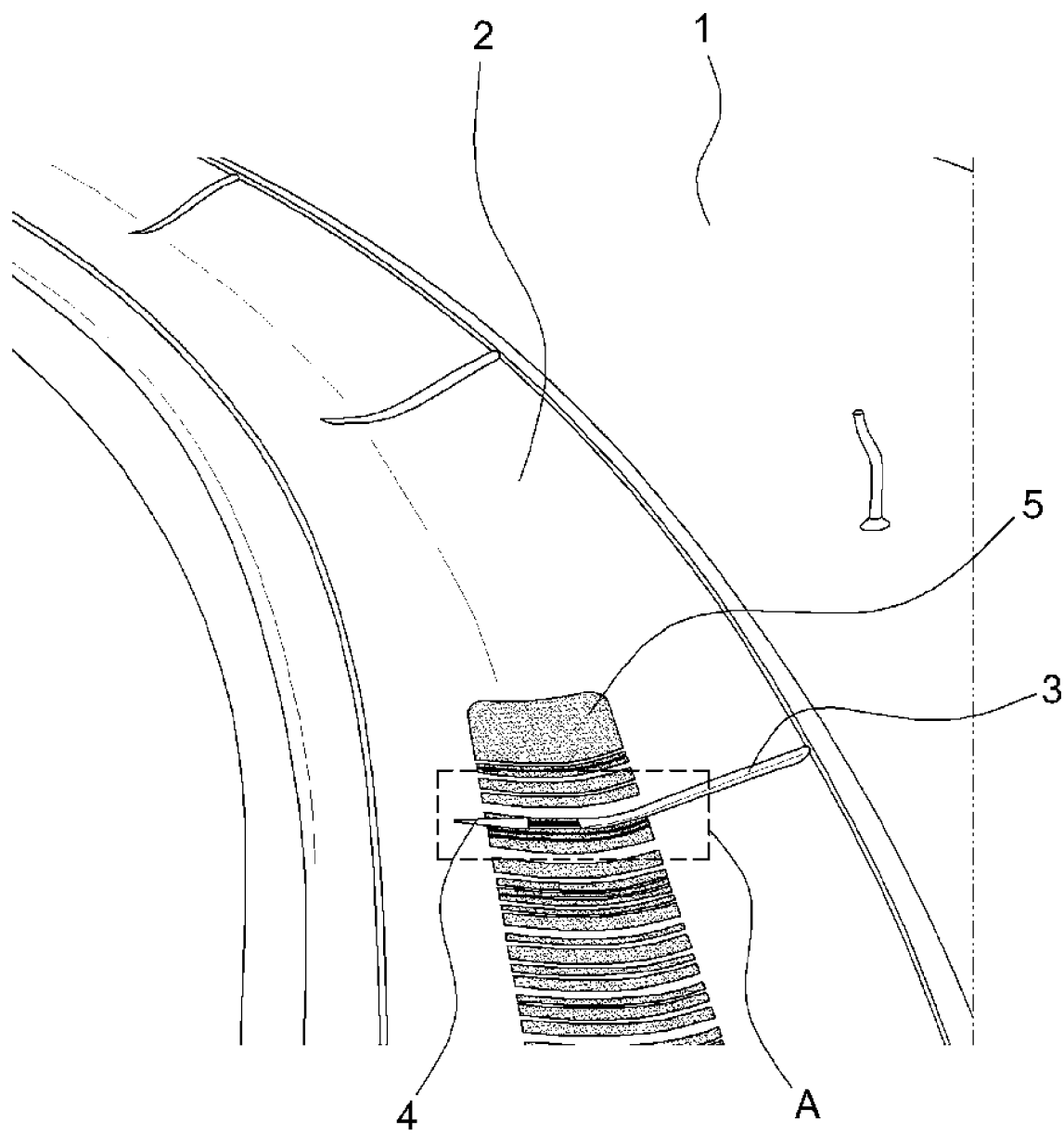
FIG. 1 shows a tire according to the related art.

Hereinafter, the present invention is described with reference to the accompanying drawings. However, the present invention may be modified in various different ways and is not limited to the embodiments described herein. Further, in the accompanying drawings, components irrelevant to the description will be omitted in order to clearly describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Hereinafter, embodiments are described in detail with reference to the accompanying drawings.

Figure 2:
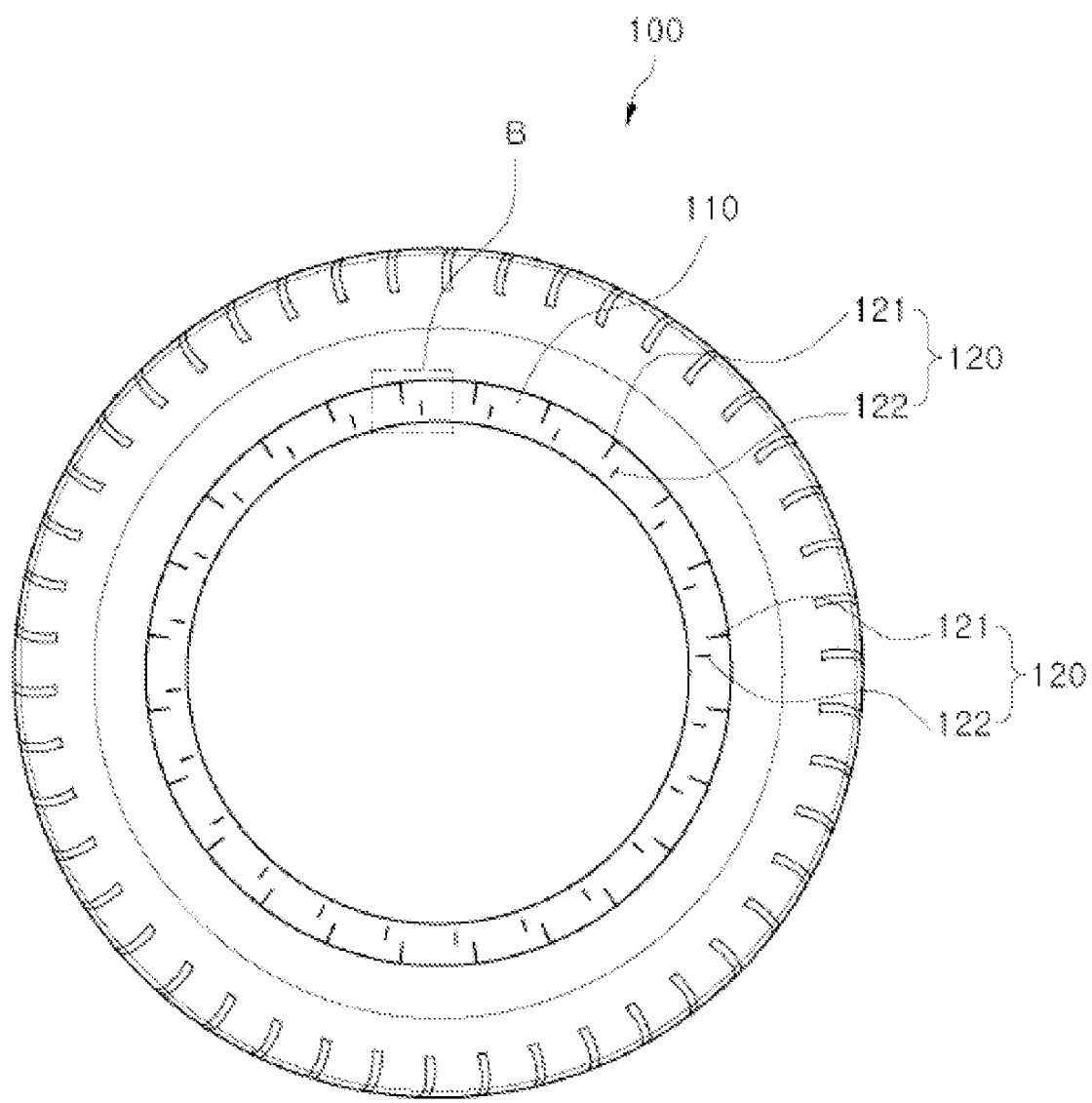
FIG. 2 is a side view of a tire with improved rim fitability according to an embodiment of the present invention.
Figure 3:
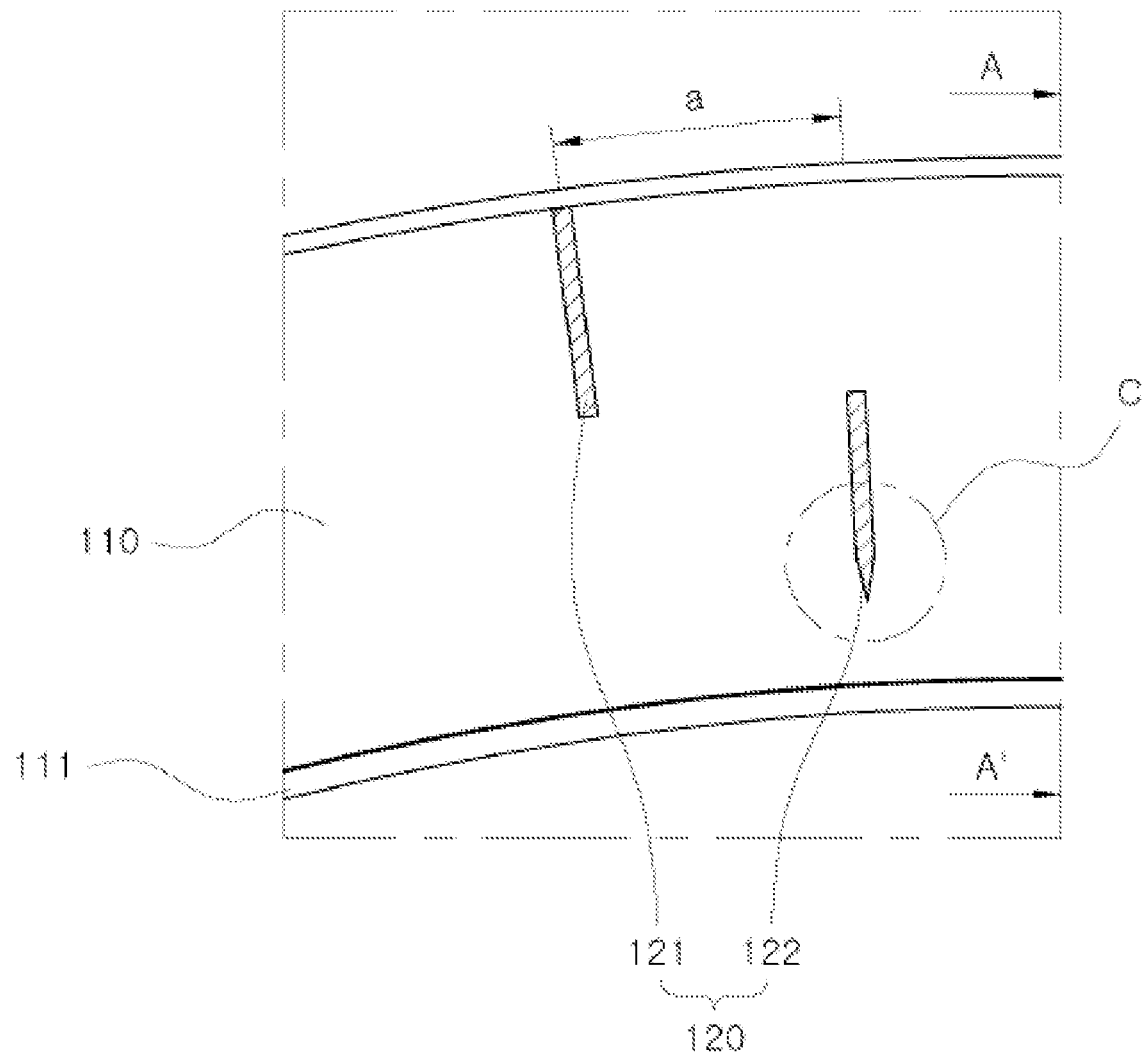
FIG. 3 is an enlarged view of the part B in FIG. 2.
Figure 4:
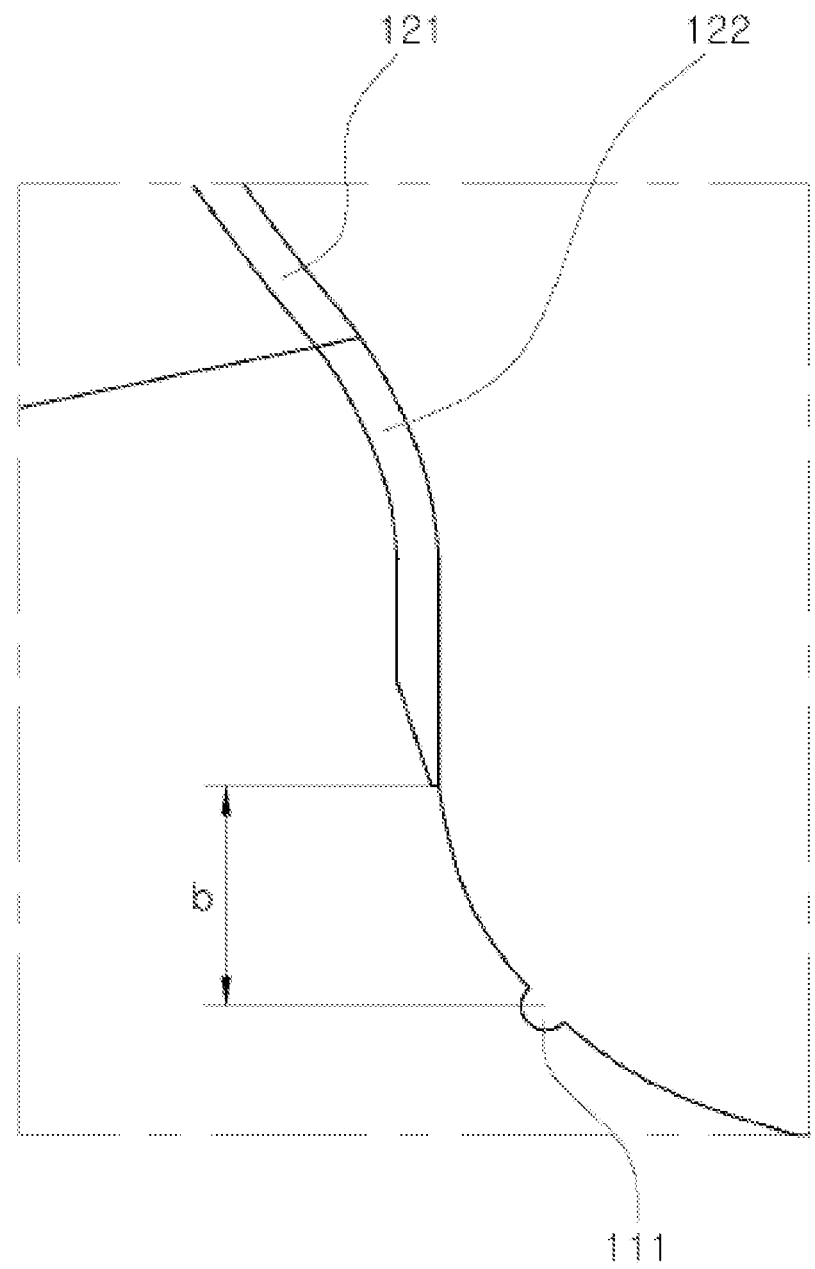
FIG. 4 is a cross-sectional view taken along line A-A' in FIG. 3.
Figure 5:
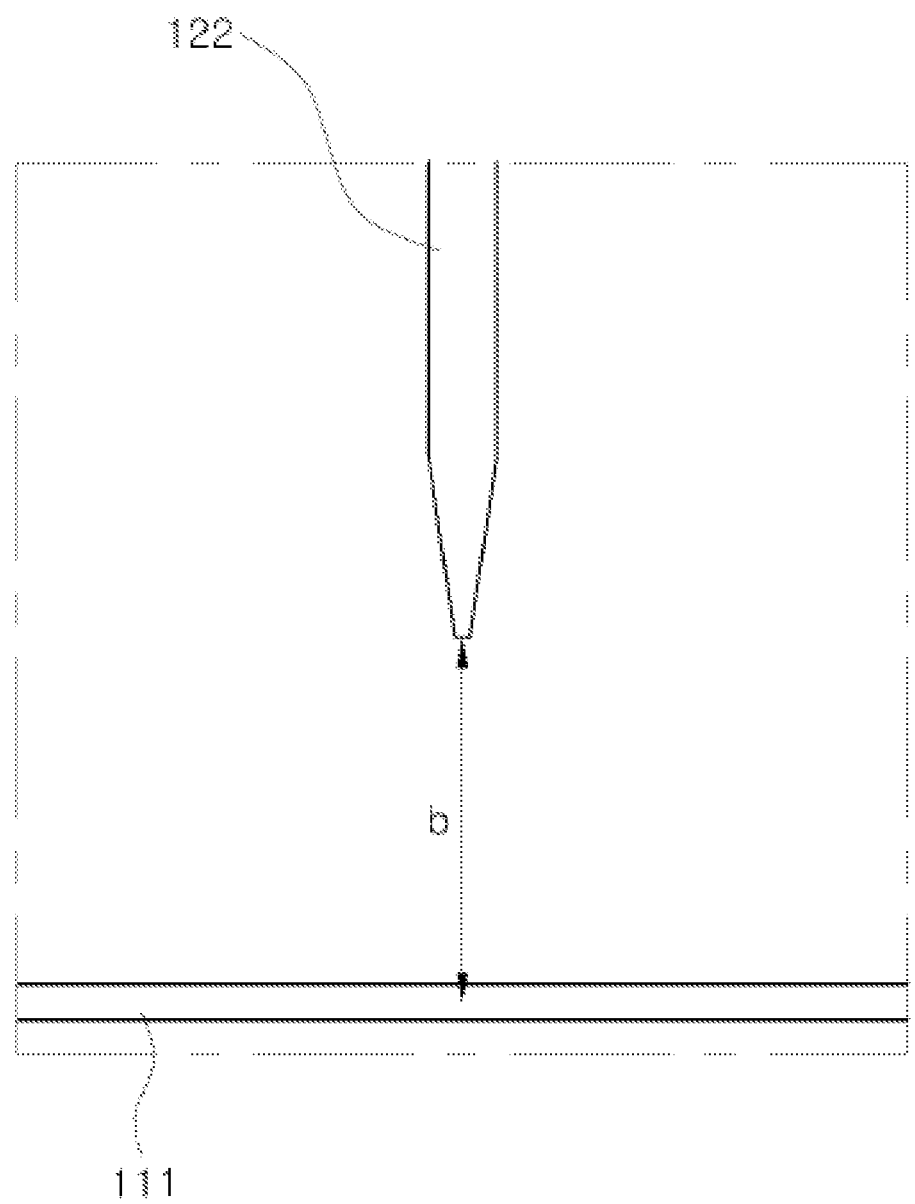
FIG. 5 is an enlarged view of the part C in FIG. 3.

FIG. 2 is a side view of a tire with improved rim fitability according to an embodiment of the present invention, and FIG. 3 is an enlarged view of the part B in FIG. 2. Further, FIG. 4 is a cross-sectional view taken along line A-A' in FIG. 3, and FIG. 5 is an enlarged view of the part C in FIG. 3.

As shown in FIGS. 2 to 5, a tire 100 with improved rim fitability according to an embodiment includes a rim seat 110 and protrusions 120.

The rim seat 110 is disposed inside from the tread of the tire and can form an area in which a rim can be seated.

Further, a rim check line L may be formed on the rim seat 110.

In particular, the rim check line L may be formed at a position such that the degree of interference with the lines of a barcode P to be attached to the rim seat by an upper protrusion unit 121 and a lower protrusion unit 122 is 0 to less than 50%.

Further, a heel point 111 extending along the inner circumference may be formed on the rim seat 110.

The protrusion 120 may include a pair of upper protrusion unit 121 and lower protrusion unit 122, and a plurality of protrusions 120 spaced apart from each other may be formed along the circumference of the rim seat 110.

The upper protrusion unit 121 and the lower protrusion unit 122 may be spaced apart from each other along the circumference of the rim seat 110.

In detail, the upper protrusion unit 121 may be spaced by a predetermined curvature 'a', which is defined in the circumferential direction of the rim seat 110, apart from the position of the lower end of the lower protrusion unit 122.

In more detail, the lower ends of the upper protrusion unit 121 and the lower protrusion unit 122 are formed at positions spaced by about 4.4 to 4.6 degrees apart from each other in the circumferential direction of the rim seat 110.

The upper protrusion unit 121 and lower protrusion unit 122, which are formed as described above, are not positioned in a straight line and deviated from each other, so they are different in shape from upper protrusions and lower protrusions in the related art.

Further, the upper protrusion unit 121 may extend from the outer side of the rim seat 110 to the rim check line and may protrude perpendicularly from the rim seat 110.

Further, the lower protrusion unit 122 may be formed such that the lower end is spaced by a predetermined gap apart from the heel point 111 and the upper end extends to the rim check line L.

In more detail, the distance 'b' between the lower end of the lower protrusion unit 122 and the heel point 111 may be 3.9 mm to 4.1 mm.

As described above, the upper protrusion unit 121 extends upward from the rim check line and the lower protrusion unit 122 extends downward from the rim check line.

That is, although the upper protrusion unit 121 and the lower protrusion unit 122 are deviated and spaced apart from each other, they are connected to each other without disconnection when they are positioned in the same straight line, so the protrusive area from the rim seat 110 can be increased as compared with the protrusions in the related art.

Further, the lower end portion of the lower protrusion unit 122 may be tapered toward the heel point 111.

Figure 6:
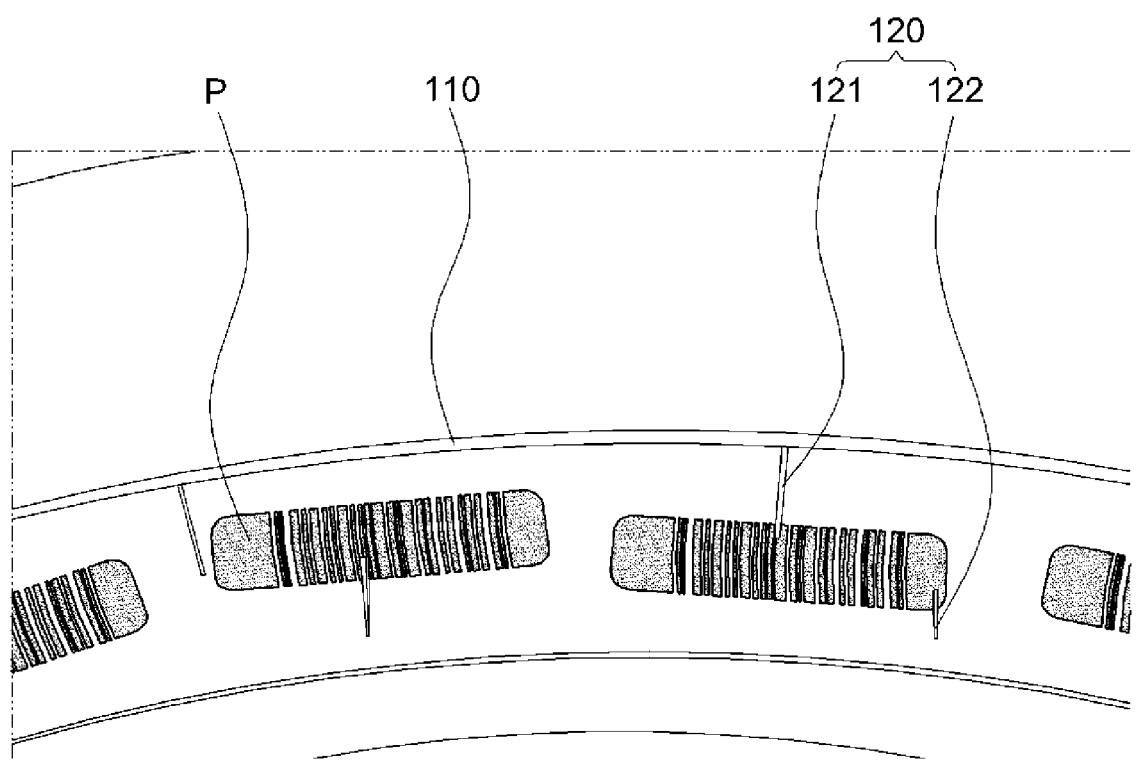
FIG. 6 is a side view showing the state when barcodes are attached to a rim seat of a tire with improved rim fitability according to an embodiment of the present invention.

FIG. 6 is a side view showing the state when barcodes are attached to a rim seat of a tire with improved rim fitability according to an embodiment of the present invention.

Referring to FIG. 6, it can be seen that the degree of interference with barcodes P by the upper protrusion units and the lower protrusion units is constantly less than 50% regardless of the positions where the barcodes P are attached to the rim seat in the tire with improved fitability according to an embodiment having the configuration described above.

That is, according to an embodiment of the present invention, the recognition rate of the barcode P can be considerably improved in comparison to the related art.

Figure 7:
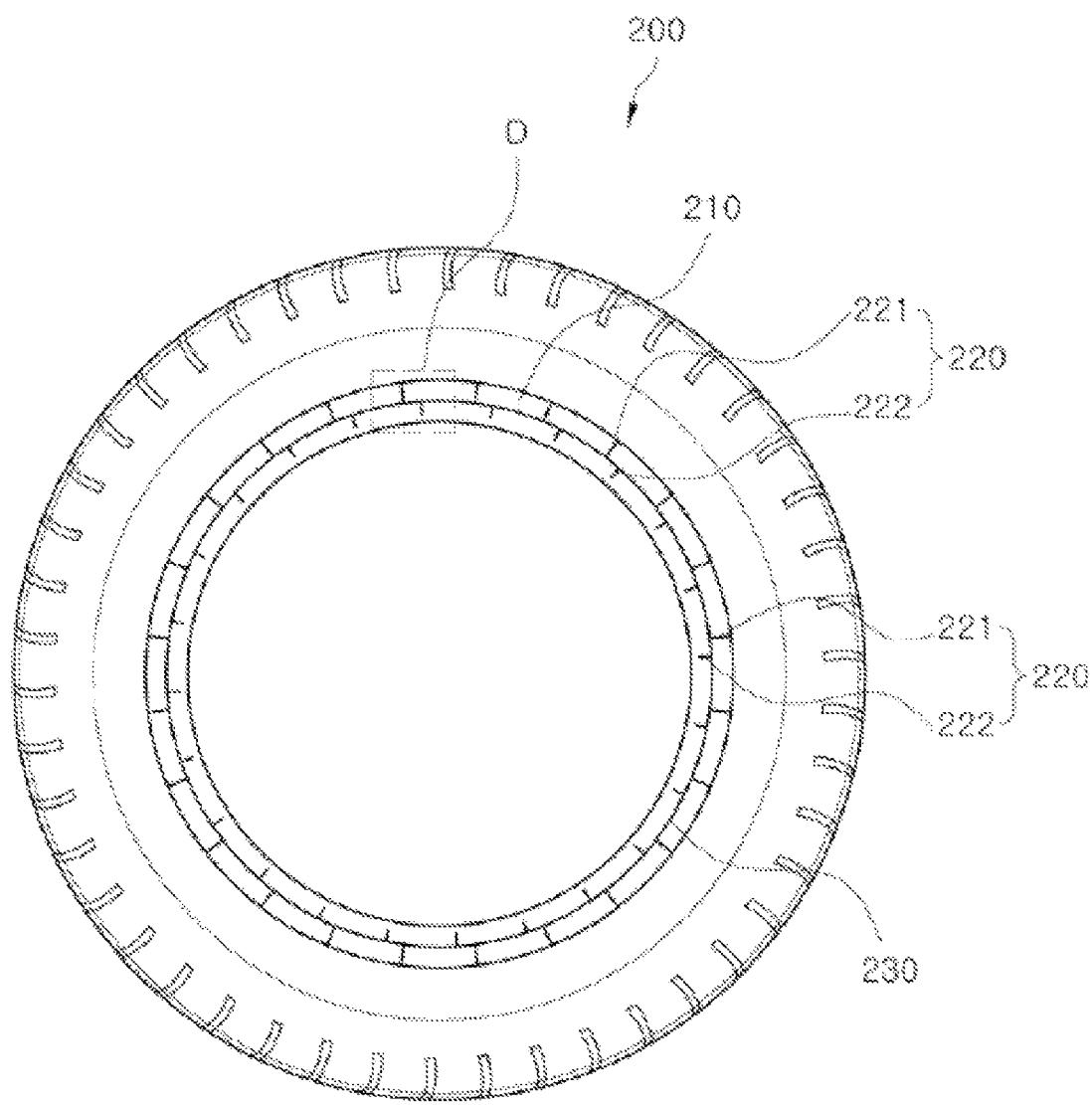
FIG. 7 is a side view of a tire with improved rim fitability according to another embodiment of the present invention.
Figure 8:
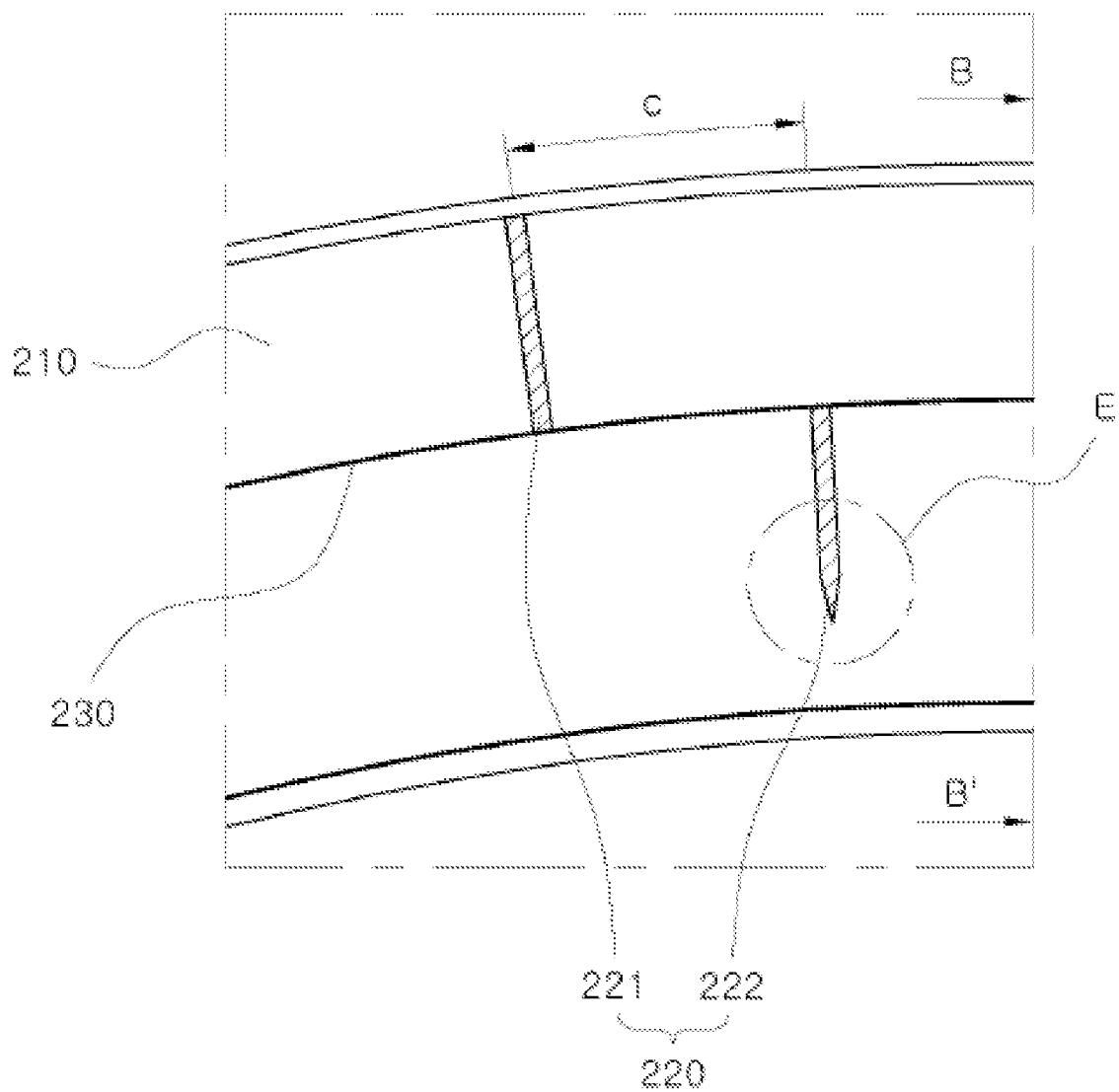
FIG. 8 is an enlarged view of the part D in FIG. 7.
Figure 9:
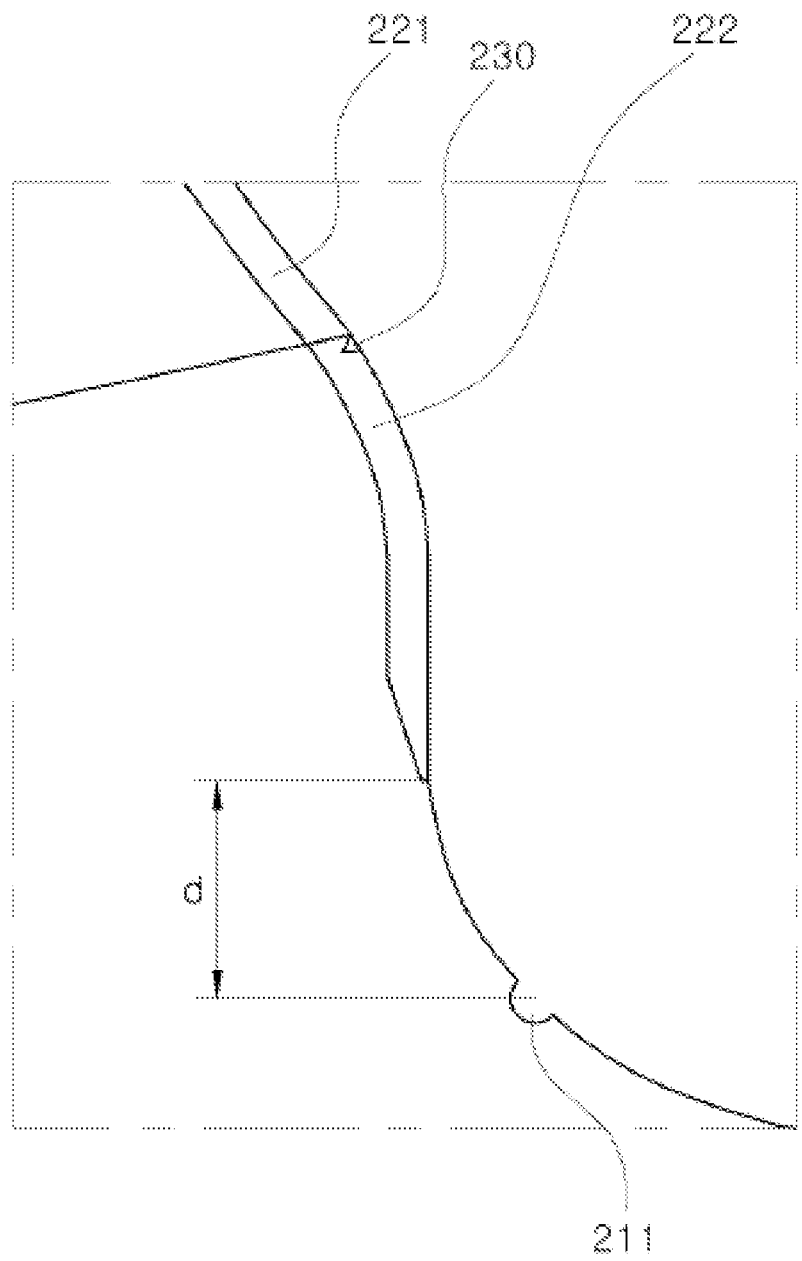
FIG. 9 is a cross-sectional view taken along line B-B' of FIG. 8.
Figure 10:
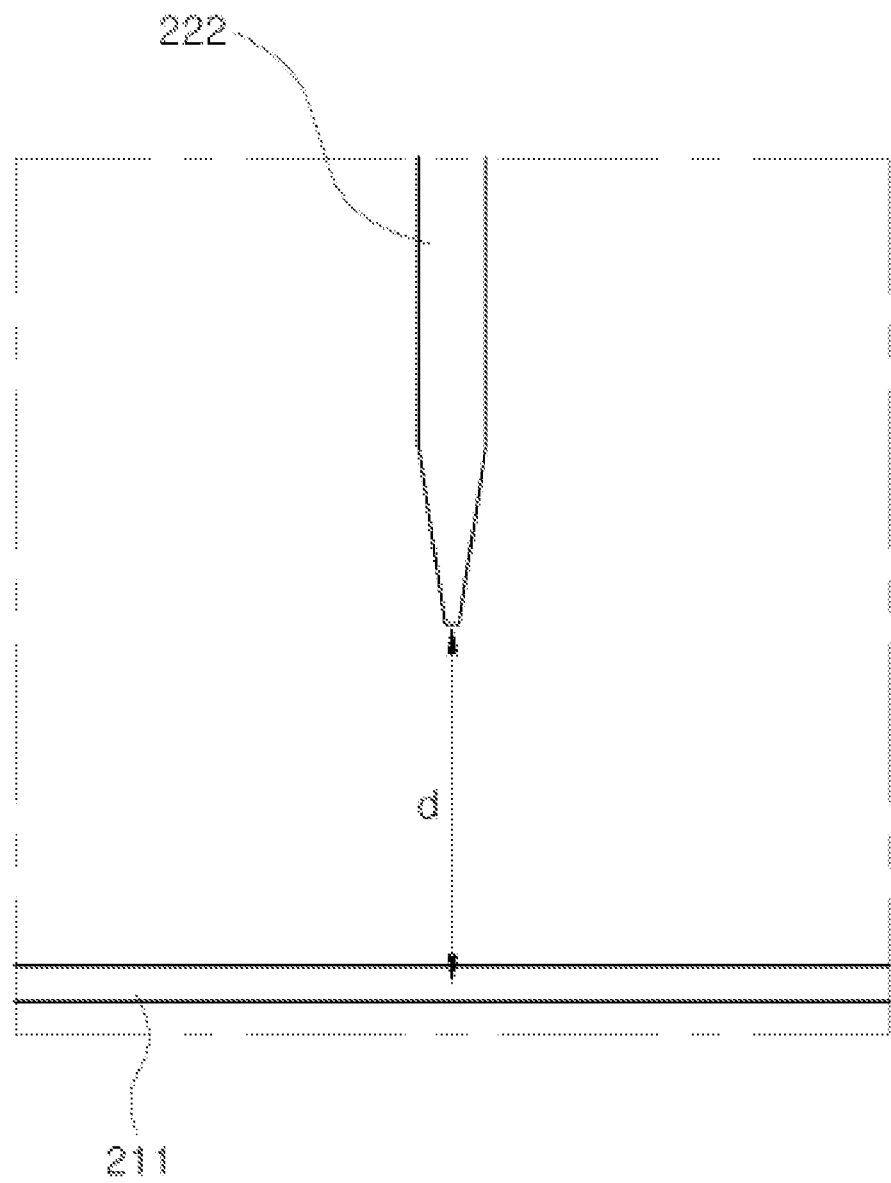
FIG. 10 is an enlarged view of the part E in FIG. 8.

FIG. 7 is a side view of a tire with improved rim fitability according to another embodiment of the present invention, and FIG. 8 is an enlarged view of the part D in FIG. 7. Further, FIG. 9 is a cross-sectional view taken along line B-B' of FIG. 8, and FIG. 10 is an enlarged view of the part E in FIG. 8.

As shown in FIGS. 7 to 10, a tire 200 with improved rim fitability according to another embodiment includes a rim seat 210, protrusions 220, and a round portion 230.

The rim seat 210 is disposed inside from the tread of the tire and can form an area in which a rim can be seated.

Further, a rim check line L may be formed on the rim seat 210.

In particular, the rim check line L may be formed at a position such that the degree of interference with the lines of a barcode P to be attached to the rim seat by an upper protrusion unit 221 and a lower protrusion unit 222 is 0 to less than 50%.

Further, a heel point 211 extending along the inner circumference may be formed on the rim seat 210.

The protrusion 220 may include a pair of upper protrusion unit 221 and lower protrusion unit 222, and a plurality of protrusions 220 spaced apart from each other may be formed along the circumference of the rim seat 210.

The upper protrusion unit 221 and the lower protrusion unit 222 may be spaced apart from each other along the circumference of the rim seat 210.

In detail, the upper protrusion unit 221 may be spaced a predetermined curvature 'c', which is defined in the circumferential direction of the rim seat 210, apart from the position of the lower end of the lower protrusion unit 222.

In more detail, the lower ends of the upper protrusion unit 221 and the lower protrusion unit 222 are formed at positions spaced by about 4.4 to 4.6 degrees apart from each other in the circumferential direction of the rim seat 210.

The upper protrusion unit 221 and lower protrusion unit 222, which are formed as described above, are not positioned in a straight line and deviated from each other, so they are different in shape from upper protrusions and lower protrusions in the related art.

Further, the upper protrusion unit 221 may extend from the outer side of the rim seat 210 to the rim check line and may protrude perpendicularly from the rim seat 210.

Further, the lower protrusion unit 222 may be formed such that the lower end is spaced by a predetermined gap apart from the heel point 211 and the upper end extends to the rim check line.

In more detail, the distance 'd' between the lower end of the lower protrusion unit 222 and the heel point 211 may be 3.9 mm to 4.1 mm.

As described above, the upper protrusion unit 221 extends upward from the rim check line and the lower protrusion unit 222 extends downward from the rim check line.

That is, although the upper protrusion unit 221 and the lower protrusion unit 222 are deviated and spaced apart from each other, they are connected to each other without disconnection when they are positioned in the same straight line, so the protrusive area from the rim seat 210 can be increased as compared with the protrusions in the related art.

Further, the lower end portion of the lower protrusion unit 222 may be tapered toward the heel point 211.

The round portion extends along the circumference of the rim seat 210 while passing by the lower end of the upper protrusion unit 221 and the upper end of the lower protrusion unit 222. That is, the round portion 230 may be formed at the same position as the rim check line L.

Further, the round portion 230, similar to the protrusion 220, may perpendicularly protrude from a surface of the rim seat 210.

Figure 11:
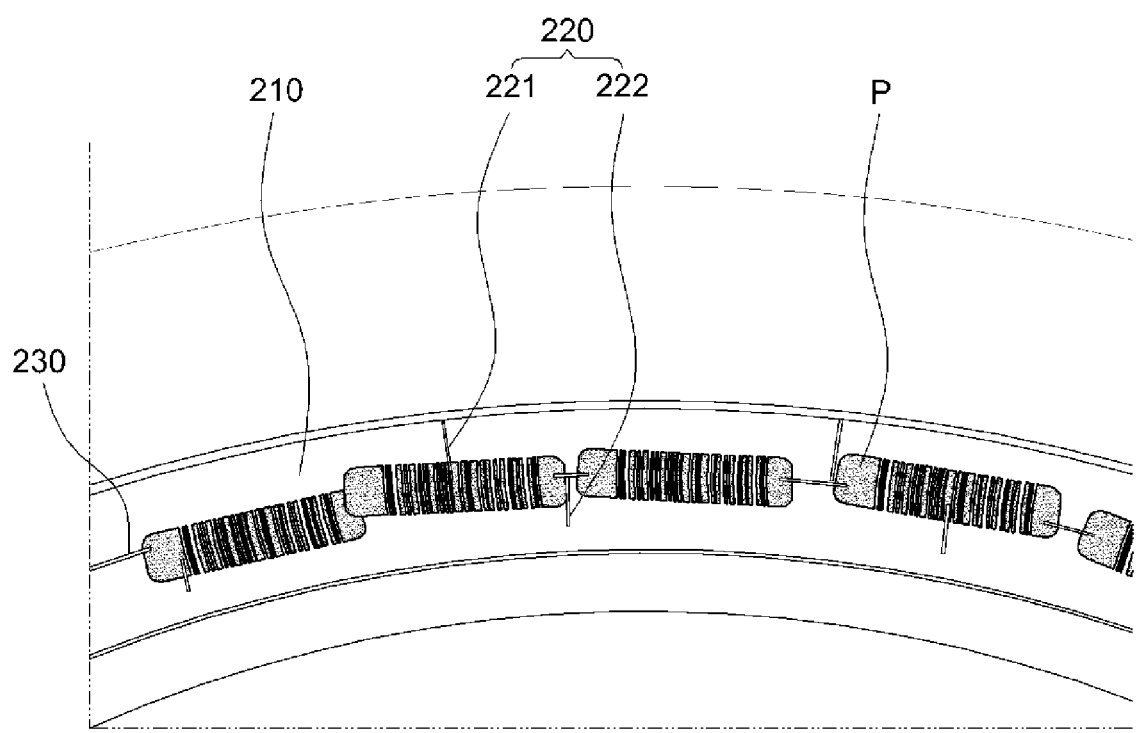
FIG. 11 is a side view showing the state when barcodes are attached to a rim seat of a tire with improved rim fitability according to another embodiment of the present invention.

FIG. 11 is a side view showing the state when barcodes are attached to a rim seat of a tire with improved rim fitability according to another embodiment of the present invention.

Referring to FIG. 11, it can be seen that the degree of interference with barcodes P by the upper protrusion units, the lower protrusion units, and the rim check line is constantly less than 50% regardless of the positions where the barcodes P are attached to the rim seat in the tire with improved fitability according to an embodiment having the configuration described above.

TABLE 1

| Item | Standard Average/Difference | Standard NG quantity/rate | HSU Average/Difference | HSU NG quantity/rate |
|---|---|---|---|---|
| Tire with improve rim fitability according to an embodiment | 3.02 1.59 | 0 0% | 5.65 3.02 | 0 0% |
| Tire with improve rim fitability according to another embodiment | 2.65 1.61 | 0 0% | 4.12 2.57 | 0 0% |

Table 1 shows a test result on a standard (LSU) and an HSU of the tires 100 and 200 with improved rim fitability according to an embodiment and another embodiment of the present invention.

Considering that the passing mark of the standard is 7 kgf and the passing mark of the HSU is 12.5 kgf, it can be seen that the evaluation results of the standard and the HSU of the tires 100 and 200 with improved rim fitability according to an embodiment and another embodiment of the present invention are both within reference values, so there is no defect.

That is, according to the present invention, it can be seen that, due to the shapes of the protrusions 120 and 220, the contact pressure of the heel increases by discharging the air caught in the rim seats 110 and 210 of the tires and the rim fitability is made uniform by reducing a pressure difference.

Further, accordingly, the present invention has an effect that air leakage is reduced and the tire is more stably seated on the rim, so steering stability is improved and unnecessary air leakage is prevented.

Further, according to the present invention, since the barcode recognition rate is improved, it is possible to solve the problem that it is required to repeat the examination of products whose barcode is not recognized, so it is economical.

According to the present invention, there is an effect that, due to the shapes of the protrusions, the contact pressure of the heel increases by discharging the air caught in the rim seat of the tire and the rim fitability is made uniform by reducing a pressure difference.

Further, accordingly, air leakage is reduced and the tire is more stably seated on the rim, so steering stability is improved and unnecessary air leakage is prevented.

Further, due to the shape of the protrusions, the recognition rate of a barcode attached to the rim seat of the tire can be improved.

The effects of the present invention are not limited thereto and it should be understood that the effects include all effects that can be inferred from the configuration of the present invention described in the following specification or claims.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as single parts may be divided and the components described as separate parts may be integrated.

The scope of the present invention is defined by the following claims, and all of changes and modifications obtained from the meaning and range of claims and equivalent concepts should be construed as being included in the scope of the present invention.

What is claimed is:

1. A tire with rim fitability, comprising:
   a rim seat disposed inside a tread of the tire to provide an area for a rim to be seated and having a rim check line;
   a plurality of upper protrusions arranged along an outer circumference of the rim seat to be spaced apart from each other, each of the plurality of upper protrusions extending from the outer circumference of the rim seat in a respective radial straight line; and
   a plurality of lower protrusions arranged along an inner circumference of the rim seat to be spaced apart from each other, each of the plurality of lower protrusions being apart from the inner circumference of the rim seat and extending in another respective radial straight line,
   wherein each of the plurality of upper protrusions is spaced apart from its most adjacent lower protrusion of the plurality of lower protrusions in a circumferential direction of the rim seat,
   wherein the rim seat has a heel point extending along the inner circumference thereof,
   wherein a lower portion of each of the plurality of lower protrusions is tapered toward the heel point, and
   wherein each of the plurality of lower protrusions has a lower end that is spaced apart from the heel point.

2. The tire of claim 1, wherein each of the plurality of upper protrusions extends to the rim check line and perpendicularly protrudes from the rim seat.

3. The tire of claim 1, wherein a distance between the lower end of each of the plurality of lower protrusions and the heel point is 3.9 to 4.1 mm.

4. The tire of claim 1, wherein each of the plurality of upper protrusions is spaced apart from its most adjacent lower protrusion of the plurality of lower protrusions in the circumferential direction of the rim seat by 4.4 to 4.6 degrees.

5. The tire of claim 1, wherein the rim seat includes a barcode that is disposed between one of the plurality of upper protrusions and its most adjacent lower protrusion such that 0 to less than 50% of any of barcode lines in the barcode is covered by the one of the plurality of upper protrusions or its most adjacent lower protrusion.

6. The tire of claim 1, further comprising a round protrusion extending along an intermediate circumference of the rim seat, wherein lower ends of the plurality of upper protrusions and upper ends of the plurality of lower protrusions are positioned on the round protrusion.

* * * * *